Sept. 6, 1938.　　　W. R. GOEHNER　　　2,129,001
AUTOMATIC CAMERA
Filed Dec. 24, 1936　　　3 Sheets-Sheet 1

INVENTOR
W. R. GOEHNER
BY
G. H. Heydt.
ATTORNEY

Sept. 6, 1938.    W. R. GOEHNER    2,129,001
AUTOMATIC CAMERA
Filed Dec. 24, 1936    3 Sheets-Sheet 2

INVENTOR
W. R. GOEHNER
BY
G. H. Heydt
ATTORNEY

Sept. 6, 1938.                 W. R. GOEHNER                    2,129,001
                               AUTOMATIC CAMERA
                              Filed Dec. 24, 1936            3 Sheets-Sheet 3

INVENTOR
W. R. GOEHNER
BY
*G. H. Heydt*
ATTORNEY

Patented Sept. 6, 1938

2,129,001

UNITED STATES PATENT OFFICE 2,129,001

AUTOMATIC CAMERA

William R. Goehner, East Orange, N. J., assignor to Bell Telephone Laboratories, Incorporated, New York, N. Y., a corporation of New York Application December 24, 1936, Serial No. 117,484

2 Claims. (Cl. 240—2)

This invention relates to automatic cameras for making photographic records.

The object of the invention is an improvement in the illumination of the field of the camera.

A feature of the invention is the provision of opaque vignetting screens having rectangular comb-like projections so located as to diffuse the light coming from the two sides of the field.

Automatic cameras for making photographic records of the readings of meters are well known and one such camera is disclosed in U. S. Patent 1,963,095, June 19, 1934, W. H. Petit and E. S. Hineline. The present invention is an improvement upon such cameras to provide a more even distribution of the light in the field of the camera and to render the operation of the camera easier and more convenient.

In the drawings.

Similar reference numerals in the various figures indicate the same parts.

Figure 1:
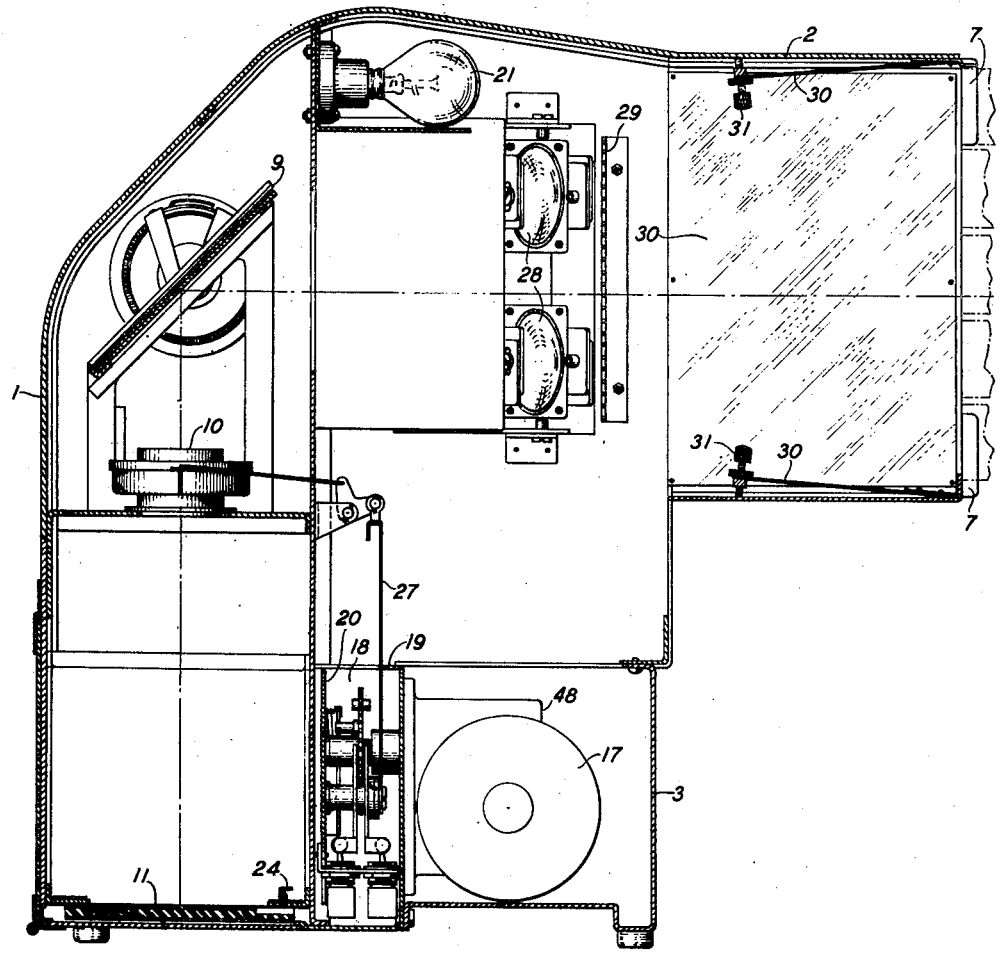
Fig. 1 is a vertical section taken on the center line of the camera.

The camera comprises a body portion 1 to which is attached a hood 2 and a support 3. The whole camera is conveniently balanced with respect to the handles 4—4 so that the hood 2 may be readily placed over the meters to be photographed. A shoulder strap may be attached to the plates 6, 6 to assist in carrying and aligning the camera.

The present invention has been shown embodied in a camera peculiarly adapted for photographing a group of the message registers in common use in the telephone industry, although the invention is not limited to this particular use. Message registers for counting the number of calls to be charged against a telephone line have been used for many years in the telephone industry and are of the general design shown in Fig. 185, page 201, Telephone Theory and Practice, Manual Switching and Substation Equipment, by Kempster B. Miller, published in 1933 by McGraw-Hill Book Company, New York. The message registers are placed side by side in rows on a mounting plate and a number of plates may be mounted vertically above each other in one bay of the mounting rack. In the present camera the hood 2 is designed to normally enclose twenty-five message registers within the field of the hood. The small projections 7, 7 on the hood may be inserted between the message registers so as to align the camera upon the desired group of twenty-five message registers.

The lamps 8, 8 placed on both sides of the axis of the camera illuminate the faces of the message registers. The light is reflected from the faces of the message registers along the axis of the camera to the mirror 9 and is reflected by the mirror 9 through the lens and shutter 10 to the sensitive film 11, thus producing a latent image on the film 11. The film may conveniently be in the form of a long strip of paper coated with a sensitive emulsion and wound upon the familiar film spool. The film compartment is in the lower rear portion of the body of the camera. The walls of the film compartment are hinged to the body of the camera and are normally held in position by flat spring catches. By releasing the catches the film compartment may be opened and the reel of film placed in position in the compartment.

Power from an alternating or direct current supply circuit of 100 to 120 volts is conducted through the usual cord to an external motor resistor and thence through a cord to a plug inserted in a receptacle fixed in the body of the camera.

The driving motor 17 is mounted upon a gear box 48 and is connected to the power supply of the camera by a cord and plug. A worm mounted on the shaft of the motor is removably connected to the gear train of the camera so that the motor may be independently removed for repair or replacement.

The operating cycle of the present camera is generally similar to that disclosed in U. S. Patent 1,963,095, and is timed by the motor driven gears and cams contained in the compartment 18. All of the cams and gears are mounted upon and contained within two mounting plates 19 and 20 mounted upon the body of the camera. The drive shaft projects through the wall of the film compartment and is formed into a driving element which fits into a socket in the film reel. Thus, the entire gear and cam assembly may be removed as a unit for repair or replacement.

After the film is threaded through the camera, the power circuit is plugged into some convenient power supply. The current flows through the lamps 8, 8 in series with a pilot lamp 21. The lamps 8, 8 are four in number, two being placed on each side of the axis of the hood and may be low voltage lamps, such as used in automobile headlights. The pilot lamps 21 may be a 15 watt, 115 volt lamp. Thus, when the current flows through the lamps 8, 8 and 21 in series, the lamp 21 will light to substantially full brilliancy, and the lamps 8, 8 will be warm and in condition to respond rapidly to an increase in the current. The lamp 21 supplies a convenient general illumination to assist in aligning the hood 2 on a desired group of registers.

The operator closes the motor control switch 22 (Fig. 2) and presses the push switch 23 conveniently located near the right handle 4. The motor 17 starts up and drives the gear train through one cycle thus reeling up the leader of the film. This procedure is repeated until the film is advanced enough to bring the sensitive area under the lens 10, when a film operated switch 24 (Fig. 1) lights the exposure lamp 25 (Fig. 2), which may be viewed through the peep hole 26 covered with red glass. The camera is then ready for use.

The hood 2 is aligned on a desired group of registers and the push switch 23 is pressed. The motor 17 starts driving the gear train. A cam in the gear train operates a switch, wired in parallel with the switch 23, to hold the motor circuit closed. Another cam operates a second switch which places a shunt of suitable resistance around the lamp 21, permitting the lamps 8, 8 to light to full brilliancy, and pulls down the rod 27 opening the shutter 10.

After the interval required for the exposure, usually about one second, the cam operates the rod 27 to close the shutter 10, and opens the switch to remove the short circuit from the lamp 21. During the exposure period, the film 11 is prevented from moving by a locking lever that holds the measuring roll though the motor 17 is continually driving a slipping clutch on the shaft of the reel. At the end of the exposure, a cam trips the locking lever and permits the measuring roll to make one revolution. This permits the slipping clutch to drive the reel and wind up the exposed film, thus drawing an unexposed area into the field of the lens 10. The cam then opens the motor switch and stops the motor.

The lamps 8, 8 are located on each side of the axis of the camera, with the axis of the lamps 8, 8 placed horizontally and inclined at an angle to the axis of the camera. By locating the lamps 8, 8 with the axis of the lamps at an angle to the axis of the camera, their filaments may lie in a plane parallel to the axis of the camera and are respectively brought to a position normal to the direction of the useful beam of light from the lamp thus increasing the illumination of the field, and producing a more uniform field.

Individual condenser lenses 28, 28 mounted in universally adjustable mountings are located in front of each lamp 8, 8. In a preferred embodiment of the invention, the lenses 28, 28 were simple plano-convex lenses of 10 dioptrics, thus having a focal length of about 4 inches. The filaments of the lamps 8, 8 were located about 2 inches from the lenses 28, 28, thus producing a diverging beam of light directed on the field of the camera. The lamps 8, 8 are sufficiently uniform that an old lamp may be replaced by a new lamp without disturbing the focus of the lenses 28, 28.

Figure 2:
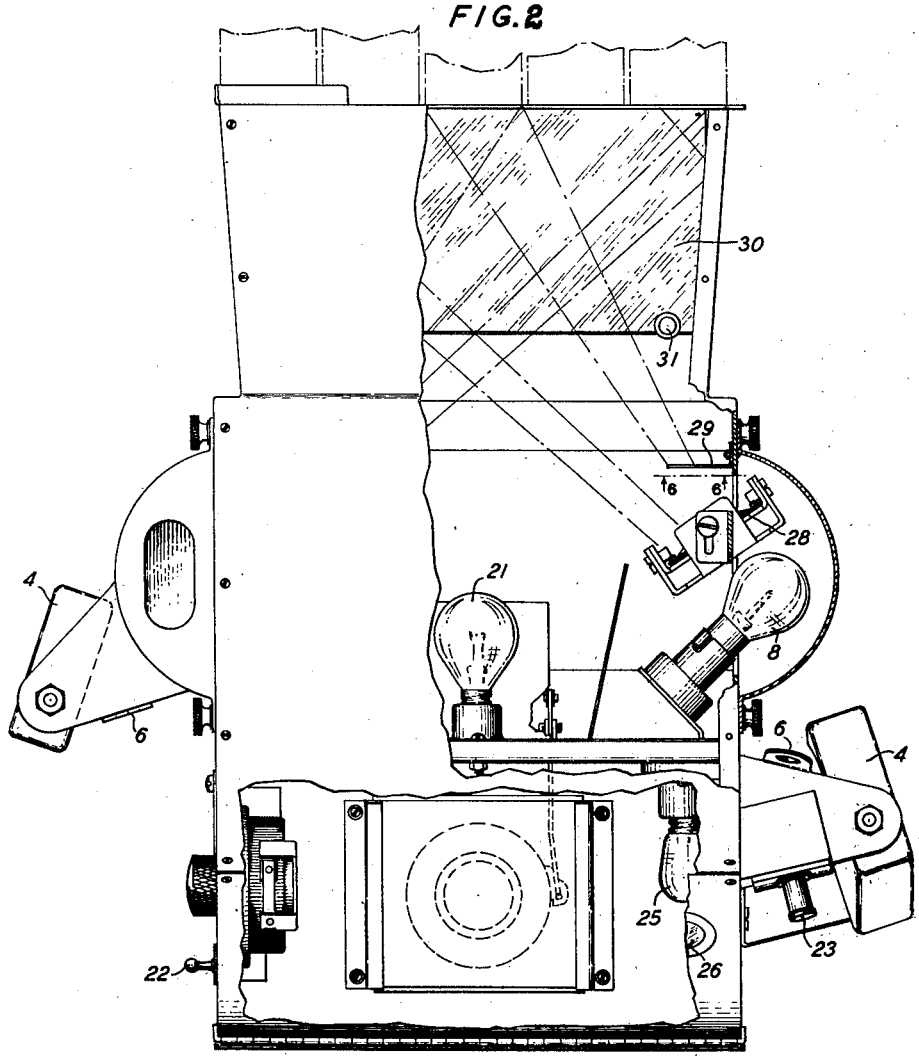
Fig. 2 is a top plan view in part section.
Figure 3:
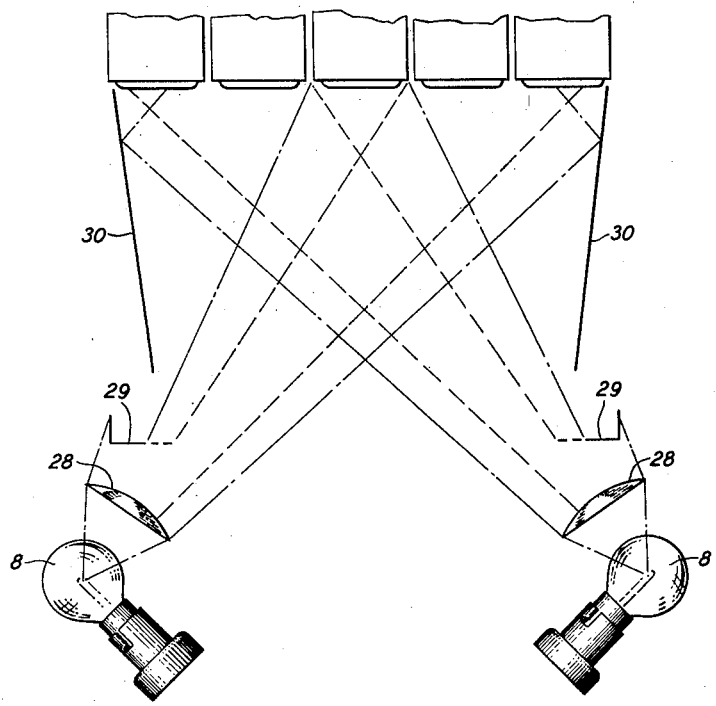
Fig. 3 is a simplified diagrammatic plan view showing the illumination of the field.
Figure 4:
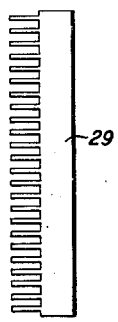
Fig. 4 is an elevation of the opaque screen.

The field of the camera is illuminated by lamps 8, 8 located on both sides of the axis of the camera, thus, as shown in Figs. 2 and 3, there will be a zone in the center of the field where the two illuminations overlap. Opaque vignetting screens 29 are placed on each side of the camera in front of the lenses 28, and are so positioned as to substantially reduce the illumination in this region of overlap. As shown in Fig. 4, the screens have rectangular, comb-like projections which break up the light in the region of overlap. In a preferred embodiment of the invention, the projections were about $\frac{1}{4}$ inch long, spaced on $\frac{1}{8}$ inch centers and the teeth were about $\frac{1}{20}$ inch wide, thus obscuring about one-quarter of the light. The improved illumination may be due to the use of a screen having comparatively long projections of small width so that a large number of projections are required to cover the field. The above dimensions are merely illustrative of a practical embodiment of the invention and do not in any way limit the scope of the invention to the particular values stated.

In the known cameras, the interior of the hood 2 was arranged to break up and diffuse the light, and was therefore painted with flat white paint or with a soft black paint. The stray light falling on the surface of the hood was thus absorbed or diffusely reflected in all directions. Such an illumination has been found to be unsuited for the photography of meters, such as the message register, which have a glass cover plate, as the random distribution of the light will contain rays which are reflected from the glass and cause an obscuring flare in the photograph. Also, in meters of this type, the figures of the meter are located some distance behind the cover plate, and some of the light must be impressed on the meter at an angle so that the figures in the corners will be fully illuminated. At the same time, the rays of light must be at such an angle that they will not be reflected from the surfaces of the glass cover into the camera and so cause flare.

In order to overcome this difficulty, as shown in Figs. 1 and 3, the interior of the hood 2 is covered by an adjustable specular reflecting surface, which may have the form of the polished metal mirrors 30, which may be angularly adjusted by the screws and lock nuts 31. The mirrors 30 are preferably placed on all four interior surfaces of the hood 2.

The improved illumination is thus produced by four features,
(1) The angular location of the lamps;
(2) The condenser lenses;
(3) The comb-like vignetting screens; and
(4) The specular reflectors.

Each of these features by itself will give improved results and any combination of the features may be used to give improved results, the best results being obtained when all four features are used.

What is claimed is:

1. In a camera of the class described, a hood enclosing the field of the camera, means for illuminating the field of said camera comprising a plurality of light sources, and a plurality of opaque vignetting screens having rectangular comblike projections, located between said sources and said field, the projections diffusing the light projected on the central area of the field.

2. The combination in claim 1 in which the screens are supported inside the hood.

WILLIAM R. GOEHNER.